United States Patent
Kumar et al.

(10) Patent No.: US 12,536,047 B2
(45) Date of Patent: Jan. 27, 2026

(54) DYNAMIC CORE ALLOCATION AMONG CONTAINERS ON A HOST

(71) Applicant: Dell Products, L.P., Hopkinton, MA (US)

(72) Inventors: Vikas Kumar, Jind (IN); Vijay Sudhakar Ghayal, Lonar (IN)

(73) Assignee: Dell Products, L.P., Hopkinton, MA (US)

( * ) Notice: Subject to any disclaimer, the term of this patent is extended or adjusted under 35 U.S.C. 154(b) by 593 days.

(21) Appl. No.: 17/949,274

(22) Filed: Sep. 21, 2022

(65) Prior Publication Data

US 2024/0095079 A1 Mar. 21, 2024

(51) Int. Cl.
*G06F 9/50* (2006.01)

(52) U.S. Cl.
CPC .................... *G06F 9/5033* (2013.01)

(58) Field of Classification Search
CPC .................................................. G06F 9/5033
See application file for complete search history.

(56) References Cited

U.S. PATENT DOCUMENTS

| | | | | |
|---|---|---|---|---|
| 7,669,202 B1* | 2/2010 | Tene | ........... | G06F 9/547 718/1 |
| 10,229,612 B2* | 3/2019 | Chen | ........... | G09B 19/0053 |
| 2003/0069972 A1* | 4/2003 | Yoshimura | ........... | H04L 12/4645 709/226 |
| 2009/0198766 A1* | 8/2009 | Chen | ........... | G06F 9/45558 718/1 |
| 2014/0282503 A1* | 9/2014 | Gmach | ........... | G06F 11/3409 718/1 |
| 2022/0075657 A1* | 3/2022 | Shimada | ........... | G06F 11/3428 |

* cited by examiner

*Primary Examiner* — S. Sough
*Assistant Examiner* — Selena Sabah Nahra
(74) *Attorney, Agent, or Firm* — Anderson Gorecki LLP

(57) ABSTRACT

A resource allocation engine distributes host resources, such as CPU cores, dynamically between a set of containers executing in the context of the host operating system. The resource allocation engine sets a lower limit on CPU allocation for each container to prevent the containers from being starved of CPU resources. The resource allocation engine monitors the utilization of the resources allocated to the containers, and redistributes the host resources dynamically among the containers based on the utilization values. Containers having high utilization values are assigned more resources correspondingly, and containers having low utilization values are assigned fewer resources. In some embodiments, the resource allocation engine assigns weights to the containers, and uses the weights to assign CPU resources for an upcoming assignment period. An operating system utility, such as C-groups, is used to implement the resource allocations to the containers for the assignment periods.

16 Claims, 10 Drawing Sheets

FIG. 4

| Container ID 300 | CGroup ID 305 | Static Core Allocation 310 | Tuning Factors 315 | Previous Dynamic Core Allocation 320 | Current Core Utilization 325 |
|---|---|---|---|---|---|
| 1001 | 1050 | 2.0 | a=0.1; b=0.2; c=0.3 | 1.5 | 23% |
| 1002 | 1068 | 1.4 | a=0.3; b=0.2; c=0.2 | 1.0 | 40% |
| ... | ... | ... | ... | ... | ... |
| n | 2248 | 3.8 | a=0.2; b=0.1; c=0.3 | 0.0 | 1.2% |

CPU allocation data structure 235

DYNAMIC CORE ALLOCATION AMONG CONTAINERS ON A HOST

FIELD

This disclosure relates to computing systems and related devices and methods, and, more particularly, to a method and apparatus for dynamic core allocation among containers on a host.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

Containers are packages of software that contain all of the necessary elements to run in any environment. Containers thus enable applications to run in self-contained environments on a host computer. Example containers include Docker containers, although other types of containers may be used as well depending on the implementation. The host computer has physical resources, such as memory and CPU cores, that are allocated to the containers. These host resources are distributed to prevent one application from causing resource starvation for the host and the other applications executing in the other containers.

According to some embodiments, rather than using static allocations of host resources to the containers, dynamic core allocation among containers on a host is provided. Instead of using static allocations, in which host resources such as host CPU cores are statically distributed to the containers, the dynamic allocation of resources enables containers that are more heavily utilized to be provided with a greater share of the host resources. Whereas static allocations can result in wastage of CPU cycles, for example when a container is idle or underutilizing its share of resources, the dynamic allocation process is able to optimize utilization of host resources by causing the host resources to be moved between the containers. This enables resources to be applied where they are most needed, while minimum allocations ensure that no container is prevented from continuing execution on the host computer.

According to some embodiments, a resource allocation engine, that itself is executing in a container, is configured to assign host resources to containers executing on a host computer. Although some embodiments are described in which the host resources are CPU cores (whole or fractional), it should be understood that other host resources may be allocated by the resource allocation engine as well.

In some embodiments the resource allocation engine distributes CPU cores dynamically to the containers executing in the context of the host operating system. The resource allocation engine sets a lower limit on CPU core allocation for each container, to prevent the containers from being starved of CPU resources. The resource allocation engine monitors the utilization of all containers and redistributes a set of CPU cores dynamically among the containers based on the utilization values. Containers having high utilization values are assigned more CPU resources correspondingly, and containers having low utilization values are assigned fewer CPU resources. In some embodiments, the resource allocation engine assigns weights to the containers, and uses the weights to assign CPU resources for an upcoming assignment period. An operating system utility, such as C-groups, is used to implement the CPU core allocations for the assignment periods.

BRIEF DESCRIPTION OF THE DRAWINGS

FIG. 4 is a functional block diagram of an example CPU allocation data structure used by the resource allocation engine in connection with dynamic core allocation among containers on a host, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
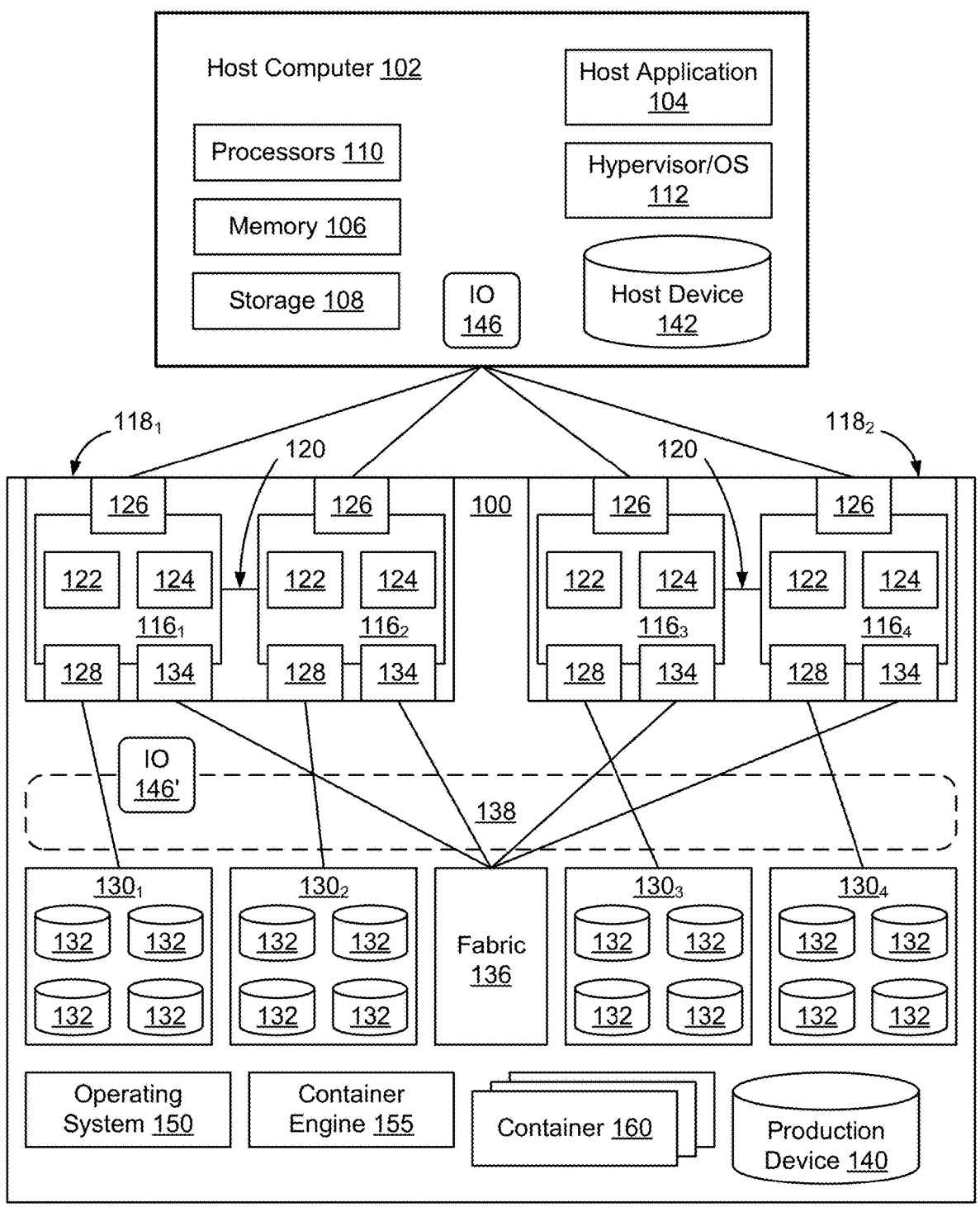
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g., via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g., in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes $116_1$-

116₄. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132.

Containers are packages of software that contain all of the necessary elements to run in any environment. Containers thus enable applications to run in self-contained environments on a host computer. Example containers include Docker containers, although other types of containers may be used as well depending on the implementation. The host computer has physical resources, such as memory and CPU cores, that are allocated to the containers. These host resources are distributed to prevent one application from causing resource starvation for the host and the other applications executing in the other containers. Although some embodiments are described herein in which the containers are implemented as Docker containers, it should be understood that other types of containers such as windows containers, Podman, runC, continerd, LXC (Linux containers), or other types of containers may be used as well depending on the implementation.

According to some embodiments, rather than using static allocations of host resources to the containers, dynamic core allocation among containers on a host is provided. Instead of using static allocations, in which host resources such as host CPU cores are statically distributed to the containers, the dynamic allocation of resources enables containers that are more heavily utilized to be provided with a greater share of the host resources. Whereas static allocations can result in wastage of CPU cycles, for example when a container is idle or underutilizing its share of resources, the dynamic allocation process is able to optimize utilization of host resources by causing the host resources to be moved between the containers. This enables resources to be applied where they are most needed, while minimum allocations ensure that no container is prevented from continuing execution on the host computer.

According to some embodiments, a resource allocation engine, that itself is executing in a container, is configured to assign host resources to containers executing on a host computer. Although some embodiments are described in which the host resources are CPU cores (whole or fractional), it should be understood that other host resources may be allocated by the resource allocation engine as well.

In some embodiments the resource allocation engine distributes CPU cores dynamically to the containers executing in the context of the host operating system. The resource allocation engine sets a lower limit on CPU core allocation for each container, to prevent the containers from being starved of CPU resources. The resource allocation engine monitors the utilization of all containers and redistributes a set of CPU cores dynamically among the containers based on the utilization values. Containers having high utilization values are assigned more CPU resources correspondingly, and containers having low utilization values are assigned fewer CPU resources. In some embodiments, the resource allocation engine assigns weights to the containers, and uses the weights to assign CPU resources for an upcoming assignment period. An operating system utility, such as C-groups, is used to implement the CPU core allocations for the assignment periods.

Figure 2:
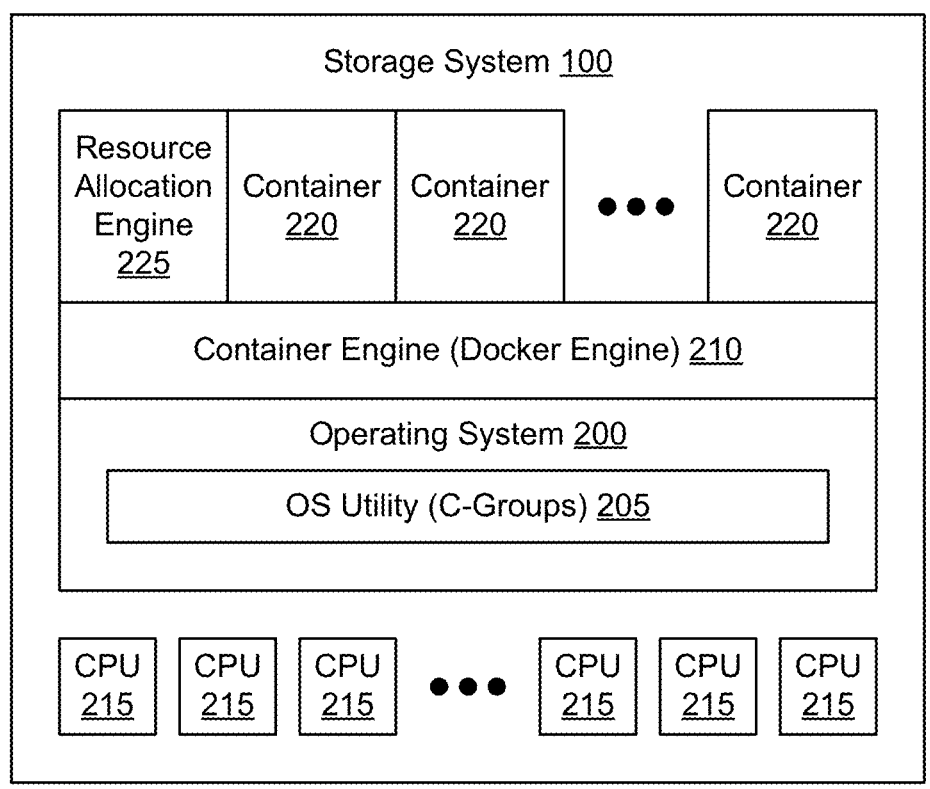
FIGS. 2 and 3 are functional block diagrams of the example storage system of FIG. 1 showing the operating system environment and containers in greater detail, according to some embodiments.
Figure 3:
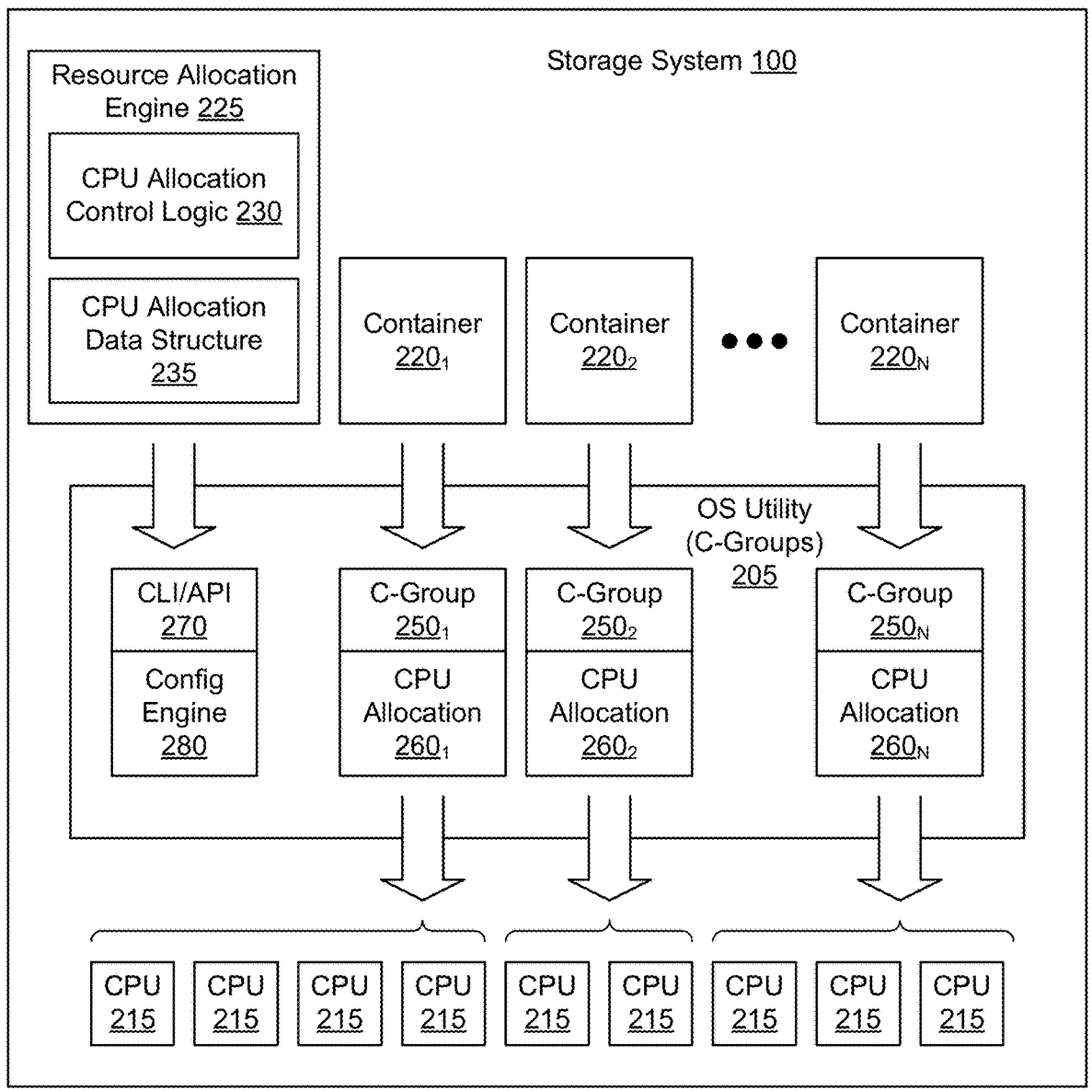

FIGS. 2 and 3 are functional block diagrams of the example storage system of FIG. 1 showing the operating system environment and containers in greater detail, according to some embodiments. As shown in FIG. 2, in some embodiments the host (storage system 100) has an operating system 200. An operating system utility, such as C-groups 205, is used to control resource allocation, such as CPU core allocation, on the host. A container engine 210, such as Docker engine, enables containers 220 to be created and execute in the context of the operating system. Although some embodiments will be described in which the containers are Docker containers, it should be understood that other types of containers may be used as well. As used herein, the term "container" is used to refer to a self-contained environment that includes one or more executable applications, libraries, utilities, and other environmental parameters required to enable the application to execute in a self-contained manner on the operating system.

As shown in FIG. 2, in some embodiments one of the containers 220 includes as an executable, a resource allocation engine 225. The resource allocation engine is configured, as described in greater detail herein, to monitor resource utilization of the containers 220 and dynamically allocate resources between the containers based on the determined resource utilization. In some embodiments, resource allocations such as CPU core assignments (whole or fractional) are implemented on the storage system 100 via the operating system utility 205. Although the resource allocation engine 225 is described as executing in a container, in some embodiments the resource allocation engine 225 is an application that is executing in the context of the operating system 200. Additionally, in some embodiments the resource allocation engine 225 is able to execute on a computer system other than the computer system hosting containers 220.

As shown in FIG. 3, in some embodiments the resource allocation engine 225 includes CPU allocation control logic 230 that maintains a CPU allocation data structure 235. An example CPU allocation data structure is shown in FIG. 4. The OS utility 205 includes a Command Line Interface (CLI)/Application Programming Interface (API) 270 that is used by the resource allocation engine 225 to set CPU allocation values for each of the containers 220. In some embodiments, in which the OS utility 205 is implemented using C-groups, each container is assigned to a particular C-group 250 and the resource allocation engine 225 sets the CPU allocation 260 for each C-group 250 based on the current CPU assignments.

FIG. 4 is a functional block diagram of an example CPU allocation data structure used by the resource allocation engine in connection with dynamic core allocation among containers on a host, according to some embodiments. As shown in FIG. 4, in some embodiments the CPU allocation data structure includes a set of entries, in which each entry includes information identifying a respective container 220 on the host (storage system 100). Example identifying information might include a container ID 300, for example. In embodiments where the operating system utility 205 is C-groups, the example identifying information might also include the C-group ID 305.

In some embodiments, each container is provided with a static core allocation 310 describing a minimum number of cores that are to be provided to the container, regardless of the CPU usage level of the container relative to the CPU usage levels of the other containers. Providing each container with a static core allocation 310 thus prevents the containers from being starved of resources. As shown in FIG. 4, in some embodiments each entry in the CPU allocation data structure 235 also includes a set of tuning factors 315 that are used to individually adjust (tune) the manner in which the set of dynamically allocated cores are provided to the individual containers. In some embodiments, the entries also include a field for a previous dynamic core allocation value 320, and a field used to maintain information indicative of a current CPU utilization value 325. Other fields may be included in the entries of the CPU allocation data structure as well, depending on the implementation. Although FIG. 4 shows the CPU allocation data structure in the form of a table for ease of explanation, it should be understood that other types of data structures may be used depending on the embodiment.

In some embodiments, the static core allocation 310 and the tuning factors 315 are user-adjustable values that can be used to prioritize CPU allocation between different types of containers on the storage system 100.

Figure 5:
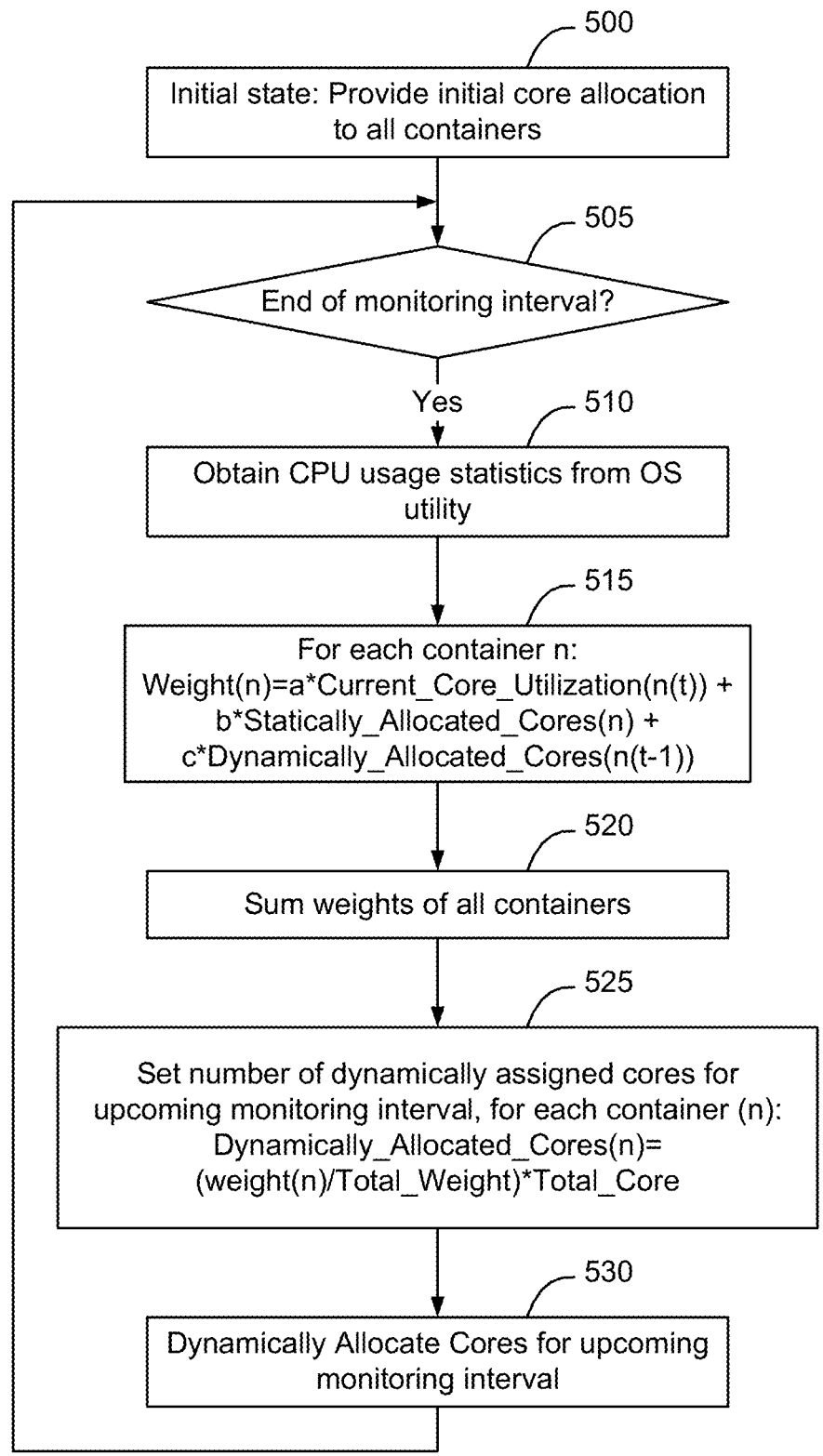
FIG. 5 is a flow chart of a process of dynamic core allocation among containers on a host, according to some embodiments.

FIG. 5 is a flow chart of a process of dynamic core allocation among containers on a host, according to some embodiments. In some embodiments the process shown in FIG. 5 is implemented by the CPU allocation control logic 230 (see FIG. 3) of the resource allocation engine 225. The process shown in FIG. 5 is used, for example to set the dynamic core allocation values 320 for an upcoming monitoring interval using the current core utilization values 325 determined during the current monitoring interval.

As shown in FIG. 5, in some embodiments during an initial state, the resource allocation engine 225 allocates an initial core allocation to all containers (block 500). The initial core allocation may be uniform across all containers, or might be different for different containers. For example, if there are 1000 cores, and there are four containers, the initial allocation might allocate 250 cores to each container. Alternatively, the initial allocation might allocate 100 cores to a first container $220_1$, 200 cores to a second container $220_2$, 300 cores to a third container $220_3$, and 400 cores to a fourth container $220_4$. The initial core allocation (block 500) might be based on a division of all available cores, or might be based on the static core allocation values 310, or might be determined using another process depending on the implementation. In some embodiments, the initial allocation provided to each container is not less than the static core allocation 310 assigned to the respective container.

The resource allocation engine 225, in some embodiments, is configured to periodically dynamically assign a set of CPU cores between the containers implemented on the host 250. For example, in some embodiments the resource allocation control logic 230 includes a timer and, upon expiration of the timer, the resource allocation control logic determines a new set of dynamically assigned CPU cores that are to be assigned to the container. As used herein, the term "monitoring interval" will be used to refer to a period of time during which a dynamic allocation of CPU cores is applied to the set of containers. During the "monitoring interval", at the end of the monitoring interval, or at some other point during the monitoring interval, the resource allocation engine 225 determines the current core utilization values 320 of each of the containers 220. The current core utilization values 320 might be an instantaneous core utilization value of the container, an average core utilization value over the duration of the monitoring interval, or another value derived from the amount of CPU resources utilized by the container during the monitoring interval. Based on the determined current core utilization 320, the resource allocation engine 225 dynamically assigns a set of cores to the containers for use by the containers during a subsequent monitoring interval. Monitoring intervals are also referred to herein as "assignment periods" since resources are dynamically assigned to the containers during the assignment periods and, during the assignment period, the use of the assigned resources is monitored to determine resource allocations for a subsequent assignment period.

Accordingly, as shown in FIG. 5, a determination is made by the resource allocation engine 225 if the end of a monitoring interval has arrived (block 505). At the end of each monitoring interval (a determination of YES at block 505) the resource allocation engine 225 obtains CPU usage statistics (block 510) describing CPU usage by each of the containers during the preceding monitoring interval. For example, in some embodiments the resource allocation engine 225 obtains the CPU usage statistics (current core utilization values 325) from the OS utility, e.g. via the OS utility CLI/API 270. The particular mechanism used by the resource allocation engine 225 to obtain CPU usage statistics will depend on the particular implementation.

The resource allocation engine 225 then calculates weights for each container based on the static core allocation value 310 for the container, the tuning factors 315, and the CPU usage statistics 325 for the container during the previous monitoring interval.

As shown in FIG. 5, in some embodiments, for each container n, the resource allocation engine 225 determines a weight(n) to be applied to the container for an upcoming monitoring interval (t) based on the set of tuning factors 315 a, b, c, the static core allocation for the container 310, the previous dynamic core allocation (t−1) and the current core utilization 325 (block 515). In particular, in some embodiments, the weight for container "n" "weight(n)" for the upcoming monitoring interval is determined as the sum of the tuning factor "a" times the current core utilization, plus the tuning factor "b" times the static core allocation for the container n, plus the tuning factor "c" times the dynamic core allocation for the container during the previous monitoring interval using Equation 1:

$$\text{Weight}(n) = a*\text{Current\_Core\_Utilization}(n(t)) + \\ b*\text{Statically\_Allocated\_Cores}(n) + \\ c*\text{Dynamically\_Allocated\_Cores}(n(t-1)) \qquad \text{Equation 1:}$$

In some embodiments, after setting the weight to be applied to each container in the set of containers, the resource allocation engine 225 sums the weights of all containers (block 520). The resource allocation engine 225 then assigns the number of dynamically assigned cores to the containers for the upcoming monitoring interval (block 525). In some embodiments the resource allocation engine 225 determines the number of dynamically allocated cores for each container "n" by dividing the available dynamically assignable cores between the containers using the using equation 2:

$$\text{Dynamically\_Allocated\_Cores}(n) = (\text{weight}(n)/\text{Total\_Weight})*\text{Total\_Core} \qquad \text{Equation 2:}$$

Where the "Total_Core" is the total number of dynamically assignable cores.

In some embodiments, the number of dynamically assignable cores is determined by determining the total number of cores managed by the resource allocation process on the storage system, subtracting the total number of statically allocated cores that have been allocated to the set of containers on the storage system, and dynamically allocating the remaining cores. For example, assume there are 1200 total cores in the storage system, that the resource allocation engine 225 is responsible for managing 1000 of the cores and is tasked with distributing those 1000 cores between the set of containers on the storage system. Assume also, in this example, that there are four containers instantiated on the storage system, and that each container has a static allocation of 100 cores. In this instance, the resource allocation engine 225 would statically allocate 400 of the 1000 cores that are being managed by the resource allocation engine 225, and dynamically allocate the remaining 600 cores between the four containers.

Once the dynamic allocations have been determined (block 525) the resource allocation engine 225 dynamically allocates the determined cores for the upcoming monitoring interval (block 530). In some embodiments, the resource allocation engine 225 issues instructions on the CL/API interface 270 of the OS utility 205 to instruct a configuration engine 280 of the OS utility 205 to assign the correct number of cores to each container for the upcoming monitoring interval.

FIGS. 6-10 are graphs showing CPU usage/utilization over time and dynamic core allocation among containers on a host, according to some embodiments.

Figure 6:
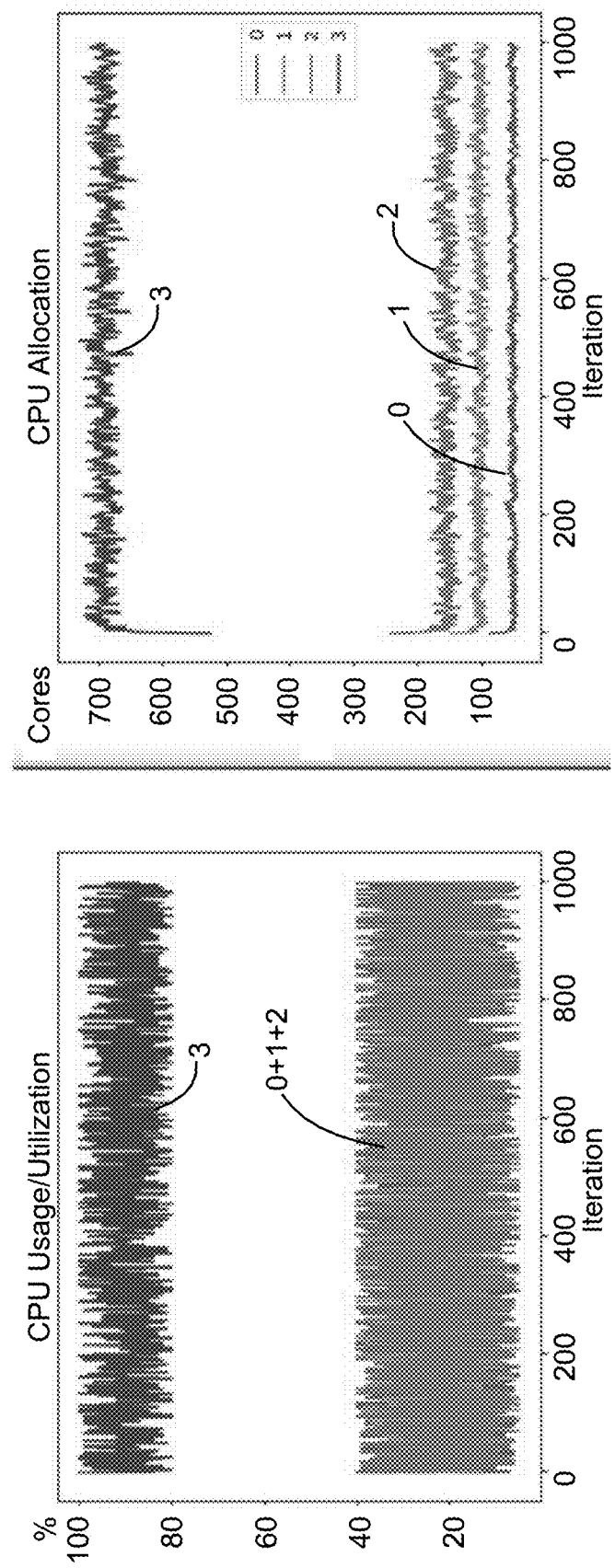
FIGS. 6-10 are graphs showing CPU usage/utilization over time and dynamic core allocation among containers on a host, according to some embodiments.

FIG. 6 shows an example where one container has a relatively high workload and the remaining containers have a relatively low workload. Specifically, the graph on the left-hand side of FIG. 6 shows example CPU utilization over time, and illustrates a scenario in which one container (container 3) has a high workload and the other containers (containers 0, 1, and 2) have a relatively low workloads.

The graph on the right-hand side of FIG. 6 shows the dynamic CPU allocation over time to the set of containers. In FIG. 6, the initial container allocations (allocated in block 500 of FIG. 5) were 100 cores to container 0, 200 cores to container 1, 300 cores to container 2, and 400 cores to container 3. Based on the relatively low CPU usage utilization, the number of cores allocated to containers 0, 1, and 2 dropped and remained low, while the number of cores allocated to container 3 jumped from its initial value of 400 cores to approximately 700 cores. As shown in FIG. 6, where one container has a high workload, and the rest of the containers have a relatively low workloads, the resource allocation engine 225 dynamically allocates more cores to the container with the high workload and deallocates the corresponding set of cores from the containers with the lower workloads.

Figure 7:
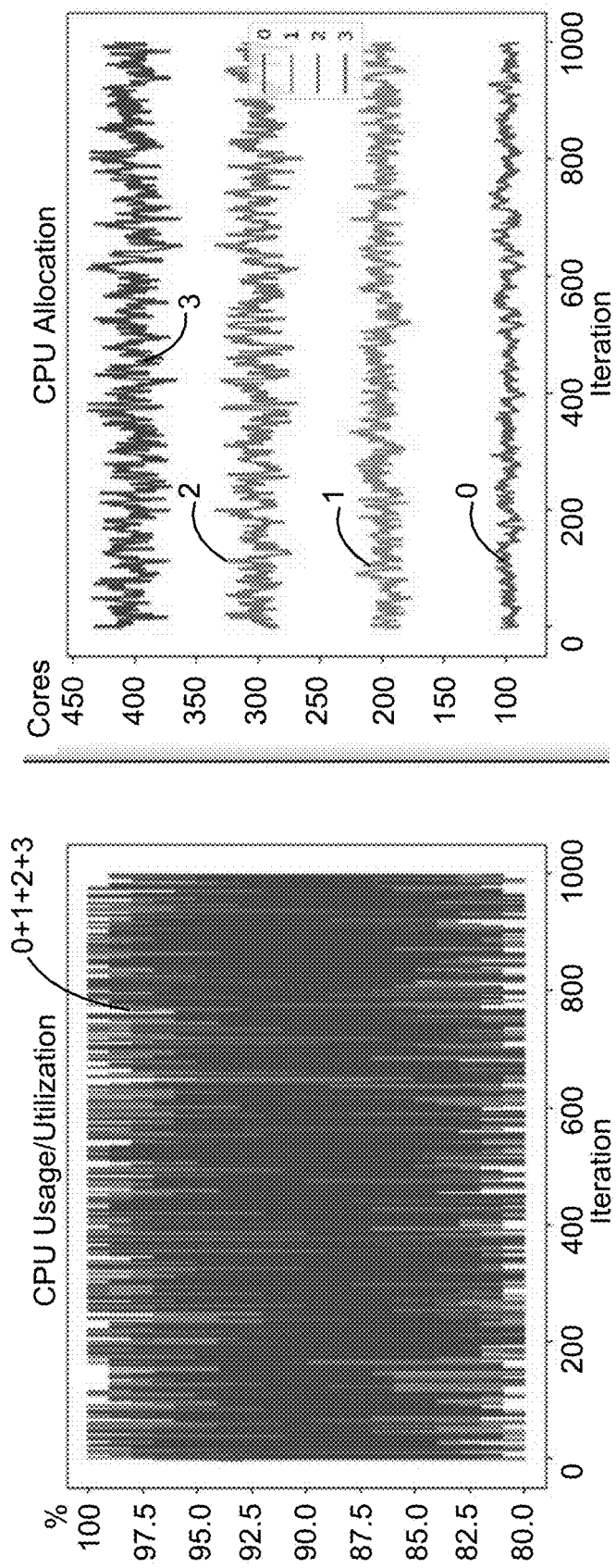

FIG. 7 shows an example where all four containers (containers 0, 1, 2, and 3) all have a relatively high workload. Specifically, the graph on the left-hand side of FIG. 7 shows example CPU utilization over time, and illustrates a scenario in which all containers (containers 0, 1, 2, and 3) have a relatively high workloads.

The graph on the right-hand side of FIG. 7 shows the dynamic CPU allocation over time to the set of containers. In FIG. 7, the initial container allocations (allocated in block 500 of FIG. 5) were 100 cores to container 0, 200 cores to container 1, 300 cores to container 2, and 400 cores to container 3. Since all of the containers have a relatively high workload, no container dominates the dynamic allocation process, and the resource allocation engine 225 maintains the initial core allocation over time between the set of containers.

Figure 8:
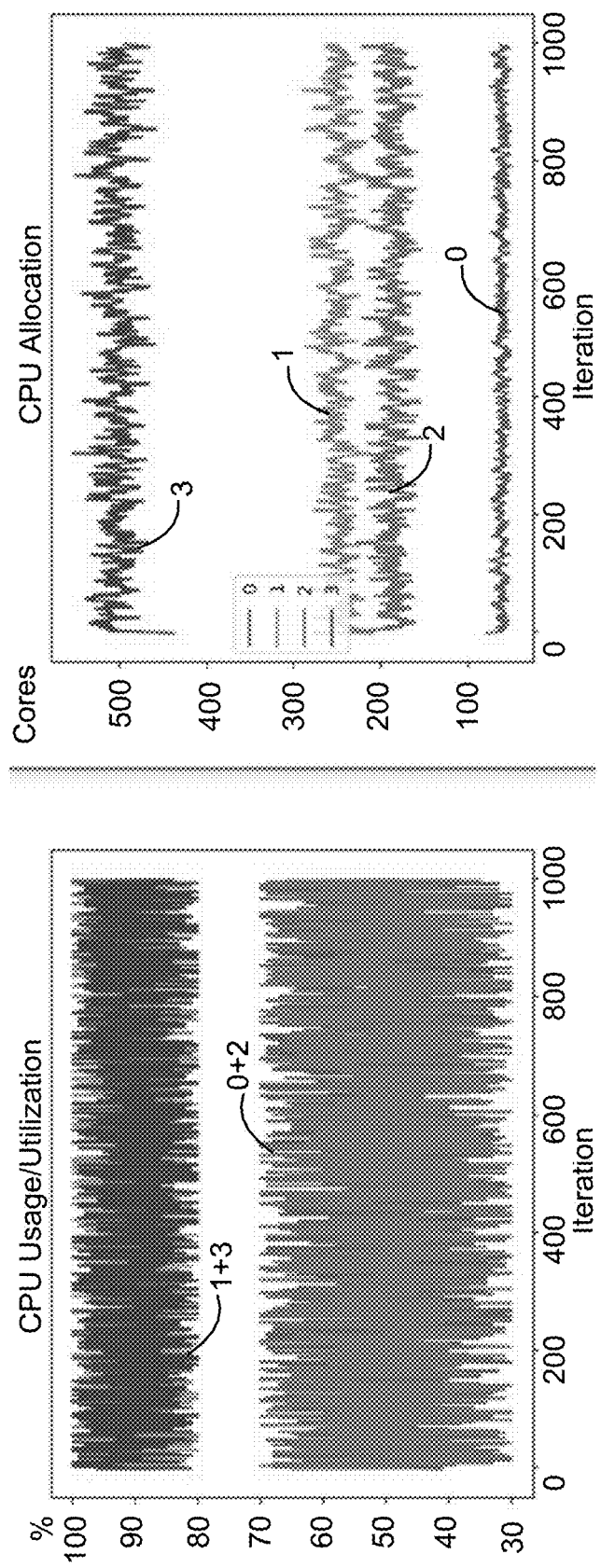

FIG. 8 shows an example where two containers (containers 1 and 3) have relatively high workloads and containers 0 and 2 have lower workloads. Specifically, the graph on the left-hand side of FIG. 8 shows example CPU utilization over time, and the graph on the right-hand side of FIG. 8 shows the dynamic CPU allocation over time.

In FIG. 8, the initial container allocations (allocated in block 500 of FIG. 5) were 100 cores to container 0, 200 cores to container 1, 300 cores to container 2, and 400 cores to container 3. Based on the relatively low workloads of containers 0 and 2, the number of cores allocated to container 0 dropped from 100 cores to approximately 50 cores, and the number of cores allocated to container 2 dropped from 300 cores to approximately 200 cores. By contrast, the number of cores allocated to container 1 increased from 200 cores to approximately 250 cores, and the number of cores allocated to container 3 increased from 400 cores to approximately 500 cores.

Figure 9:
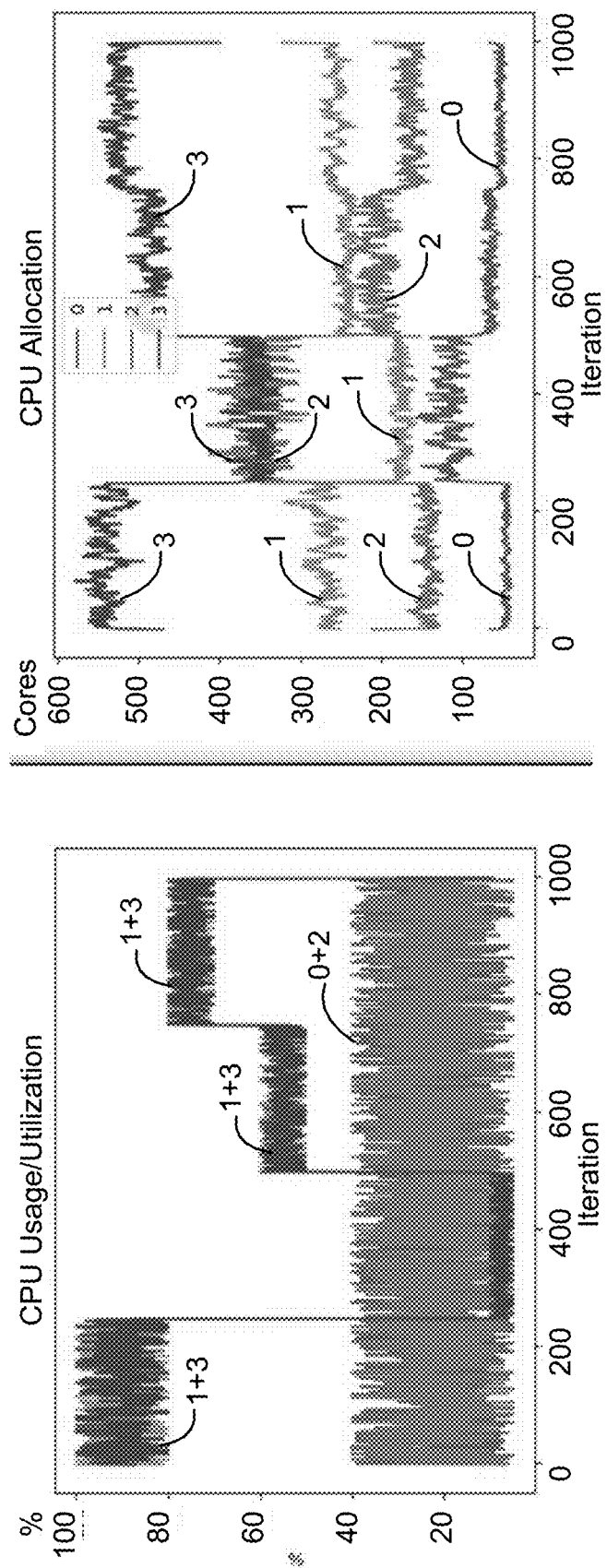

FIG. 9 shows an example where the workloads on containers 1 and 3 are initially high, then low, intermediate, and high again. Specifically, the graph on the left-hand side of FIG. 9 shows example CPU utilization over time, and the graph on the right-hand side of FIG. 9 shows the dynamic CPU allocation over time.

As shown in the graph on the right-hand side of FIG. 9, the initial container allocations (allocated in block 500 of FIG. 5) were 100 cores to container 0, 200 cores to container 1, 300 cores to container 2, and 400 cores to container 3. Based on the relatively low workloads of containers 0 and 2, the number of cores allocated to containers 0 and 2 dropped. Likewise, based on the initial high workloads of containers 1 and 3, the dynamic core allocation process initially increased the core allocations to those containers. When the workloads on containers 1 and 3 was reduced, the dynamic core allocation process redistributed the number of cores between the containers. As the workloads on containers 1 and 3 increased, the dynamic core allocation process reallocated an additional number of cores to those containers. Accordingly, as shown in FIG. 9, the resource allocation engine 225 was able to accurately adjust the number of cores allocated to each of the containers based on the CPU utilization values to track changes in CPU utilization over time.

Figure 10:
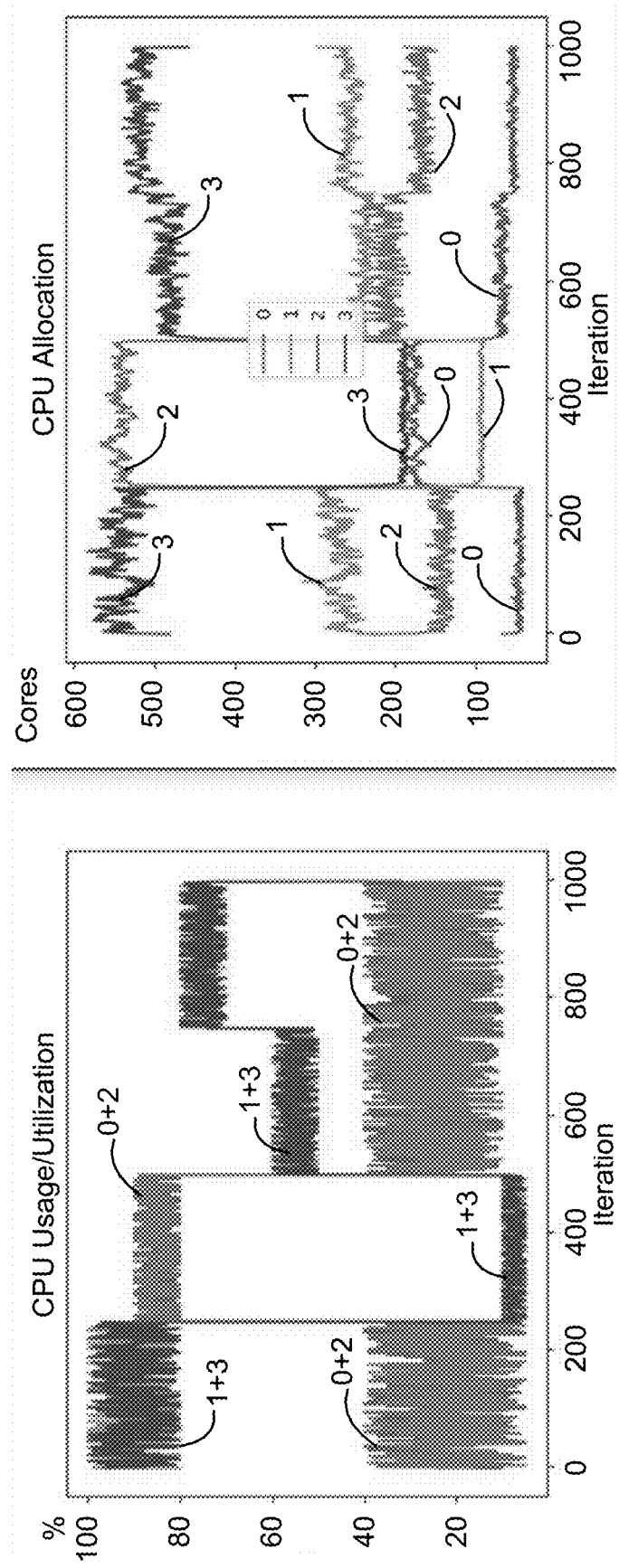

FIG. 10 shows an example where the workloads on containers 1 and 3 were initially high and the workloads on containers 0 and 2 were initially low. The workloads then switched, such that the workloads on containers 1 and 3 were low and the workloads on containers 0 and 2 were high. The workloads then switched again, such that the workloads on containers 1 and 3 were again high and the workloads on containers 0 and 2 were again low.

As shown in the graph on the right-hand side of FIG. 10, the initial container allocations (allocated in block 500 of FIG. 5) were 100 cores to container 0, 200 cores to container 1, 300 cores to container 2, and 400 cores to container 3. Based on the relatively low workloads of containers 0 and 2, the number of cores allocated to containers 0 and 2 initially dropped. Likewise, based on the initial high workloads of containers 1 and 3, the dynamic core allocation process initially increased the allocations to those containers. When the workloads on the containers switched, the dynamic CPU allocation dynamically reduced the number of cores allocated to containers 1 and 3, and dynamically increased the number of cores allocated to containers 0 and 2. When the workloads switched again, the dynamic CPU allocation process once again reallocated the number of cores that were allocated to each of the containers. Accordingly, as shown in FIG. 10, the resource allocation engine 225 was able to accurately adjust the number of cores allocated to each of the containers based on the CPU utilization values to track changes in CPU utilization over time.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium.

The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for dynamic Central Processing Unit (CPU) core allocation to containers executing on a host computer, the computer program including a set of instructions which, when executed by the host computer, cause the host computer to perform a method comprising the steps of:

executing a resource allocation engine in one of the containers on the host computer, the resource allocation engine being configured to adjust CPU core allocations to a set of the containers on the host computer by periodically iterating the steps of:

determining, by the resource allocation engine, respective initial CPU core allocations of a set of available CPU cores on the host computer to be allocated to each respective container of the set of the containers, the initial CPU core allocations specifying respective quantities of the set of available CPU cores to be allocated to and reserved for use by each respective container;

allocating the respective quantities of the set of available CPU cores by an operating system of the host computer to each respective container for use by each respective container, the respective quantities of the set of available CPU cores being based on the initial CPU core allocations;

using the respective allocated CPU cores by each respective container over a current monitoring interval;

monitoring, by the resource allocation engine, CPU core utilization by each respective container over the monitoring interval;

determining, based on the monitored CPU core utilization, updated CPU core allocations of the set of available CPU cores on the host computer by the resource allocation engine, the updated CPU core allocations specifying respective changed quantities of the set of available CPU cores to be allocated to and reserved for use by each respective container for a subsequent monitoring interval; and allocating the respective changed quantities of the set of available CPU cores by the operating system of the host computer to each respective container for use by each respective container, the respective changed quantities of the set of available CPU cores being based on the updated CPU core allocations for the subsequent monitoring interval;

wherein determining the updated CPU core allocations for the subsequent monitoring interval comprises:

maintaining a resource allocation data structure by the resource allocation engine, the resource allocation data structure containing a respective entry for each respective container, each respective entry identifying the respective container, a minimum static CPU core allocation for the respective container, and a set of user adjustable tuning factors for the respective container to be used to dynamically determine CPU core allocations by the resource allocation engine; and calculating a respective weight for each respective container by the resource allocation engine, the respective weight being based on the CPU core utilization by the respective container during the monitoring intervals, the minimum static CPU core allocation for the respective container, the CPU core allocation for the respective container during a previous monitoring interval, and respective tuning factors for the respective container.

2. The non-transitory tangible computer readable storage medium of claim 1:

wherein each respective container is a self-contained environment, each respective container including one or more executable applications, libraries, utilities, and environmental parameters required to enable the application to execute in a self-contained manner on the operating system on the host computer; and wherein the respective initial CPU core allocations and the updated CPU core allocations are based at least in part on the minimum static CPU core allocations for each respective container.

3. The non-transitory tangible computer readable storage medium of claim 2, wherein the allocations of the CPU cores include allocations of whole CPU cores and allocations of fractional CPU cores.

4. The non-transitory tangible computer readable storage medium of claim 2, the method further comprising instructing, by the resource allocation engine, a utility in the host operating system to allocate the respective changed quantities of the set of available CPU cores based on the updated CPU core allocations.

5. The non-transitory tangible computer readable storage medium of claim 4, wherein the utility is C-groups.

6. The non-transitory tangible computer readable storage medium of claim 1, wherein the tuning factors are used, by the resource allocation engine, to individually adjust the manner in which the updated CPU core allocations are determined for each respective container.

7. The non-transitory tangible computer readable storage medium of claim 1, wherein calculating the weight for each respective container for the subsequent monitoring interval comprises summing a first of the tuning factors times the current CPU core utilization during the current monitoring interval, plus a second of the tuning factors times the static CPU core allocation for the respective container, plus a third of the tuning factors times a dynamic CPU core allocation for the respective container during the previous monitoring interval.

8. The non-transitory tangible computer readable storage medium of claim 7, further comprising summing the weights of all containers of the set of containers; and
wherein determining the updated CPU core allocations comprises dividing the weight of each respective container with the summed weights of all containers of the set of containers to determine a percentage of an available quantity of dynamically allocated CPU cores to be allocated to each respective containers.

9. A method of dynamic Central Processing Unit (CPU) core allocation to containers executing on a host computer, the method being executed by the host computer, the method comprising:
executing a resource allocation engine in one of the containers on the host computer, the resource allocation engine being configured to adjust CPU core allocations to a set of the containers on the host computer by periodically iterating the steps of:
determining, by the resource allocation engine, respective initial CPU core allocations of a set of available CPU cores on the host computer to be allocated to each respective container of the set of the containers, the initial CPU core allocations specifying respective quantities of the set of available CPU cores to be allocated to and reserved for use by each respective container;
allocating the respective quantities of the set of available CPU cores by an operating system of the host computer to each respective container for use by each respective container, the respective quantities of the set of available CPU cores being based on the initial CPU core allocations;
using the respective allocated CPU cores by each respective container over a current monitoring interval;
monitoring, by the resource allocation engine, CPU core utilization by each respective container over the monitoring interval;
determining, based on the monitored CPU core utilization, updated CPU core allocations of the set of available CPU cores on the host computer by the resource allocation engine, the updated CPU core allocations specifying respective changed quantities of the set of available CPU cores to be allocated to and reserved for use by each respective container for a subsequent monitoring interval; and
allocating the respective changed quantities of the set of available CPU cores by the operating system of the host computer to each respective container for use by each respective container, the respective changed quantities of the set of available CPU cores being based on the updated CPU core allocations for the subsequent monitoring interval;
wherein determining the updated CPU core allocations for the subsequent monitoring interval comprises:
maintaining a resource allocation data structure by the resource allocation engine, the resource allocation data structure containing a respective entry for each respective container, each respective entry identifying the respective container, a minimum static CPU core allocation for the respective container, and a set of user adjustable tuning factors for the respective container to be used to dynamically determine CPU core allocations by the resource allocation engine; and
calculating a respective weight for each respective container by the resource allocation engine, the respective weight being based on the CPU core utilization by the respective container during the monitoring intervals, the minimum static CPU core allocation for the respective container, the CPU core allocation for the respective container during a previous monitoring interval, and respective tuning factors for the respective container.

10. The method of claim 9:
wherein each respective container is a self-contained environment, each respective container including one or more executable applications, libraries, utilities, and environmental parameters required to enable the application to execute in a self-contained manner on the operating system on the host computer; and
wherein the respective initial CPU core allocations and the updated CPU core allocations are based at least in part on the minimum static CPU core allocations for each respective container.

11. The method of claim 10, wherein the allocations of the CPU cores include allocations of whole CPU cores and allocations of fractional CPU cores.

12. The method of claim 10, the method further comprising instructing, by the resource allocation engine, a utility in the host operating system to allocate the respective changed quantities of the set of available CPU cores based on the updated CPU core allocations.

13. The method of claim 12, wherein the utility is C-groups.

14. The method of claim 9, wherein the tuning factors are used, by the resource allocation engine, to individually adjust the manner in which the updated CPU core allocations are determined for each respective container.

15. The method of claim 9, wherein calculating the weight for each respective container for the subsequent monitoring interval comprises summing a first of the tuning factors times the current CPU core utilization during the current monitoring interval, plus a second of the tuning factors times the static CPU core allocation for the respective container, plus a third of the tuning factors times a dynamic CPU core allocation for the respective container during the previous monitoring interval.

16. The method of claim 15, further comprising summing the weights of all containers of the set of containers; and wherein determining the updated CPU core allocations comprises dividing the weight of each respective container with the summed weights of all containers of the set of containers to determine a percentage of an available quantity of dynamically allocated CPU cores to be allocated to each respective containers.

* * * * *